United States Patent
You et al.

(10) Patent No.: US 8,493,570 B2
(45) Date of Patent: Jul. 23, 2013

(54) THREE-DIMENSIONAL SHAPE MEASURING APPARATUS

(75) Inventors: Joon-Ho You, Daejeon (KR); MinGu Kang, Daejeon (KR); Ssang-gun Lim, Daejeon (KR)

(73) Assignee: Intekplus Co., Ltd., Daejeon (KR)

( * ) Notice: Subject to any disclaimer, the term of this patent is extended or adjusted under 35 U.S.C. 154(b) by 394 days.

(21) Appl. No.: 12/747,751

(22) PCT Filed: Dec. 10, 2008

(86) PCT No.: PCT/KR2008/007313
§ 371 (c)(1), (2), (4) Date: Jun. 11, 2010

(87) PCT Pub. No.: WO2009/078616
PCT Pub. Date: Jun. 25, 2009

(65) Prior Publication Data
US 2010/0265517 A1   Oct. 21, 2010

(30) Foreign Application Priority Data
Dec. 14, 2007  (KR) ........................ 10-2007-0131393

(51) Int. Cl.
*G01B 11/02* (2006.01)

(52) U.S. Cl.
USPC ........................................................ 356/516

(58) Field of Classification Search
USPC .................................. 356/489, 495, 511, 516
See application file for complete search history.

(56) References Cited

U.S. PATENT DOCUMENTS

| 7,433,054 B1 * | 10/2008 | Tischhauser et al. ......... 356/519 |
| 7,542,149 B2 * | 6/2009 | Spanner et al. ............... 356/498 |
| 7,548,320 B2 * | 6/2009 | Chan et al. ................... 356/497 |
| 7,710,577 B2 * | 5/2010 | Yatagai et al. ................ 356/492 |

FOREIGN PATENT DOCUMENTS

| JP | 08-159723 | 6/1996 |
| JP | 09-178451 | 7/1997 |
| KR | 10-0785802 | 12/2007 |
| KR | 10-2008-0053558 | 6/2008 |

OTHER PUBLICATIONS

International Search Report—PCT/KR2008/007313 dated Jun. 29, 2009.

* cited by examiner

*Primary Examiner* — Michael A Lyons
(74) *Attorney, Agent, or Firm* — Kile Park Reed & Houtteman PLLC

(57) ABSTRACT

The three-dimensional shape measuring apparatus includes a light source; a beam splitter to split illumination light from the light source; a target object to be measured, having a height difference between the highest point and the lowest point; a reference mirror, on which another beam emitted from the beam splitter is irradiated; a light detecting element to detect an interference pattern generated by the interference of an object beam reflected by the surface of the target object and a reference beam reflected by the surface of the reference mirror; and a control computer to process an image detected by the light detecting element, wherein a subsidiary reference beam generating unit to change the optical path of the beam from the beam splitter to generate a subsidiary reference beam is provided between the beam splitter and the reference mirror.

9 Claims, 6 Drawing Sheets

Fig.5
*Prior Art*
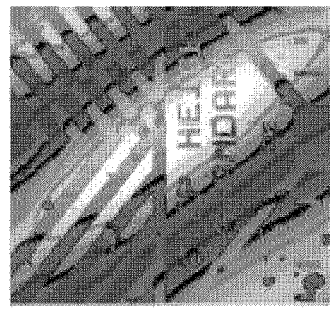
IMAGE WITH INTERFERENCE PATTERN
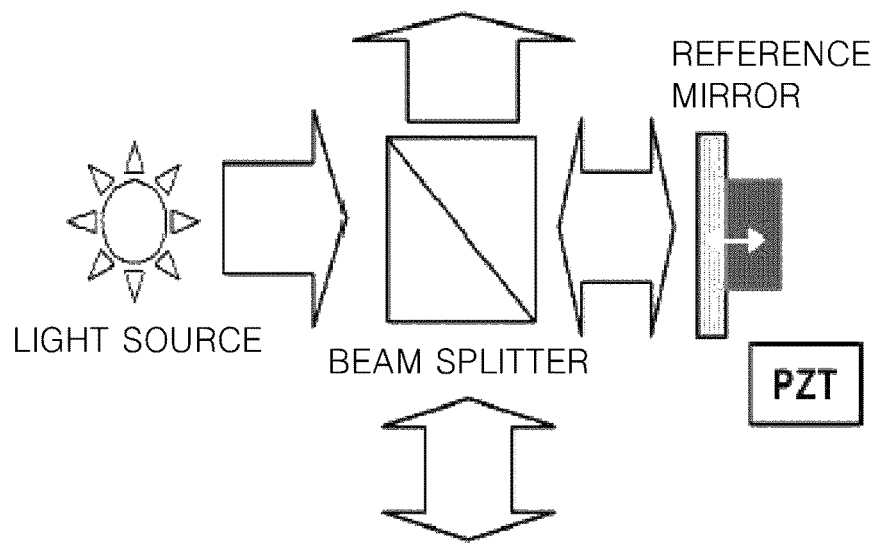
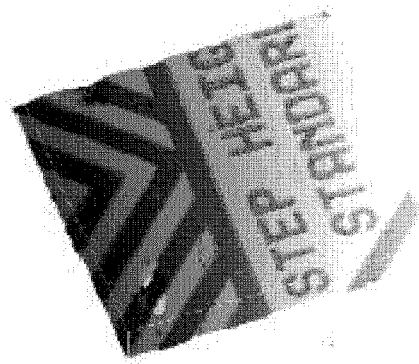
TARGET OBJECT TO BE MEASURED

US 8,493,570 B2

THREE-DIMENSIONAL SHAPE MEASURING APPARATUS

TECHNICAL FIELD

The present invention relates to a three-dimensional shape measuring apparatus, and more particularly to a three-dimensional shape measuring apparatus, which has a reflection distance adjusting unit to respectively generate a reference beam having the same focal distance and optical path as those of an object beam reflected by the highest point of a target object having a three-dimensional shape and a reference beam having the same focal distance and optical path as those of an object beam reflected by the lowest point of the target object so as to simultaneously obtain an interference pattern for the highest point of the target object and an interference pattern for the lowest point of the target object.

BACKGROUND ART

Recently, in order to inspect the processed and manufactured state of a fine structure having a complicated stepped structure due to miniaturization and refinement of electronic and mechanical parts, a high measurement accuracy to size, shape, and surface roughness has been required.

Therefore, a size measuring method using an optical two-dimensional measuring device and a shape or a thickness (surface roughness) measuring method using an optical three-dimensional measuring device are used now in measurement of small-sized electronic and mechanical parts.

As one of conventional optical three-dimensional measuring devices, a three-dimensional shape measuring apparatus using interferometry has been proposed.

FIG. 5 is a view illustrating the measurement principle of general interferometry. When illumination light emitted from a light source is split into beams by a beam splitter and the beams are respectively irradiated onto a reference mirror and the surface of a target object to be measured, a reference beam and an object beam respectively reflected by the reference mirror and the surface of the target object are joined by the beam splitter and interfere with each other to generate an interference pattern. Here, the interference pattern is formed at a point, where the beams irradiated respectively onto the surface of the target object and the surface of the reference mirror, i.e., a reference surface, have the same focal distance, and the optical paths of the reference beam and the object beam coincide with each other.

The height of the target object is measured by calculating the phase of the interference pattern by detecting the interference pattern with a light detecting element, such as a CCD camera, or abstracting a point with the maximum coherency from the envelope of the interference pattern.

Therefore, after an interference pattern obtaining area of a target object having a stepped structure is divided into uniform sections according to the height data, the reference surface or the target object is minutely moved according to the divided sections to generate interference patterns, and the obtained plural interference patterns are joined to measure the surface shape of the target object.

In case of a ball grid array (BGA) having a three-dimensional shape with a stepped structure, it is possible to infer the surface shape of the BGA or determine whether or not the BGA is defective by obtaining only interference patterns for the lowest point and the highest point.

However, even in this case, since the overall three-dimensional shape of the BGA cannot be measured from an image, which is obtained once, a single interference pattern is obtained by joining the interference pattern corresponding to the highest point and the interference pattern corresponding to the lowest point, which are respectively obtained, or an interference pattern for the overall regions from the highest point to the lowest point is obtained, and thus an inspection speed is low.

Further, in case that reflectivities at the highest and lowest points are different, for example, in case that the reflectivity at the highest point of the BGA made of a metal is high and the reflectivity at the lowest point of the BGA made of a material for a PCB is low, when the reflectivity of the reference surface coincides with the reflectivity of any one of the highest point and the lowest point, the other one of the highest point and the lowest point cannot be measured well.

In order to solve the above problems, Korean Patent Application No. 2007-0052290 entitled "Apparatus for measurement of three-dimensional shape" filed by the applicant of the present invention is disclosed.

The above three-dimensional shape measuring apparatus, as shown in FIG. 6, includes a light source 100, a beam splitter 200 to split illumination light emitted from the light source 100 into beams, a target object 300 to be measured, onto which the illumination light from the beam splitter 200 is irradiated and has a height difference between the highest point and the lowest point, a reference mirror 400, onto which the illumination light from the beam splitter 200 is irradiated, a light detecting element 500 to capture an interference pattern generated by joining beams respectively reflected by the surface of the target object 300 and the surface of the reference mirror 400, a reflection distance adjusting unit 700 to provide reflection distances, which are respectively equal to the reflection distance of the highest point of the target object 300 and the reflection distance of the lowest point of the target object 300, and a control computer 600 to process the image captured by the light detecting element 500.

Here, the reflection distance adjusting unit 700 has a thickness, which is equal to the height difference between the highest point and the lowest point of the target object 300, to provide reference beams A1 and A2 having reflection distances being equal to those of the highest point and the lowest point of the target object 300, i.e., having reflection distances being equal to those of object beams A1 and A2. Further, in case that the target object 300 is replaced with a new one and thus a height difference is changed, the reflection distance adjusting unit 700 adjusts reflection distances by adjusting a position according to the target object. Thereby, the reflection distance adjusting unit 700 is capable of generating reference beams being equal to object beams in connection with the target object to be measured.

Therefore, the above apparatus simultaneously obtains interference patterns for the highest point and the lowest point of the target object, and thus improves an inspection speed.

However, since an interference pattern is generated when focusing conditions are satisfied and reflection optical paths of the reference beam and the object beam coincide with each other, in case that height data of a target object to be measured are changed, when the reflection distances are adjusted, the focal distance of the beams does not coincide with each other, and when the focal distances are adjusted, and the reflection distances are do not coincide with each other.

DISCLOSURE OF INVENTION

Technical Problem

Therefore, the present invention has been made in view of the above problems, and it is an object of the present invention to provide a three-dimensional shape measuring apparatus to measure the shape of a target object to be measured by obtaining an interference pattern generated by the interference between an object beam and a reference beam respectively reflected by the target object and a reference mirror, in which a reference beam and a subsidiary reference beam respectively having the same focal distances and optical paths as those of object beams respectively reflected by the highest point and the lowest point of the target object having a stepped structure with a height difference so as to simultaneously obtain an interference pattern for the highest point of the target object and an interference pattern for the lowest point of the target object.

Technical Solution

In accordance with one aspect of the present invention, the above and other objects can be accomplished by the provision of a three-dimensional shape measuring apparatus including a light source; a beam splitter to split illumination light from the light source into beams; a target object to be measured, on which one beam emitted from the beam splitter is irradiated, having a height difference between the highest point and the lowest point; a reference mirror, on which another beam emitted from the beam splitter is irradiated; a light detecting element to detect an interference pattern generated by the interference of an object beam reflected by the surface of the target object and a reference beam reflected by the surface of the reference mirror; and a control computer to process an image detected by the light detecting element, wherein a subsidiary reference beam generating unit to change the optical path of the beam from the beam splitter to generate a subsidiary reference beam is provided between the beam splitter and the reference mirror.

The subsidiary reference beam generating unit may include a subsidiary beam splitter provided between the beam splitter and the reference mirror; and a subsidiary reference mirror provided at one side of the subsidiary beam splitter neighboring with the reference mirror.

The subsidiary beam splitter may include a plate beam splitter provided with a flat front surface, onto which the beam from the beam splitter is irradiated, and a rear surface being parallel with the front surface, and the front surface of the plate beam splitter may be coated with an anti-reflective material, and the rear surface of the plate beam splitter may be coated with a beam splitting material. The beam split ratio of the rear surface of the plate beam splitter may be set to 50%:50%.

The subsidiary beam splitter may further include a compensation plate contacting the rear surface of the plate beam splitter to adjust optical paths toward the reference mirror and the subsidiary reference mirror. The rear surface of the compensation plate may be coated with an anti-reflective material.

The subsidiary reference beam generating unit may further include a fine driving unit to finely drive at least one of the subsidiary beam splitter, the reference mirror, and the subsidiary reference mirror in the direction of an X, Y, or Z axis.

BRIEF DESCRIPTION OF DRAWINGS

The above and other objects, features and other advantages of the present invention will be more clearly understood from the following detailed description taken in conjunction with the accompanying drawings, in which:

FIG. 5 is a view illustrating the measurement principle of a general interferometry and FIG. 6 is a schematic view of a conventional three-dimensional shape measuring apparatus.

BEST MODE FOR CARRYING OUT THE INVENTION

Now, preferred embodiments of the present invention will be described in detail with reference to the annexed drawings.

Figure 1:
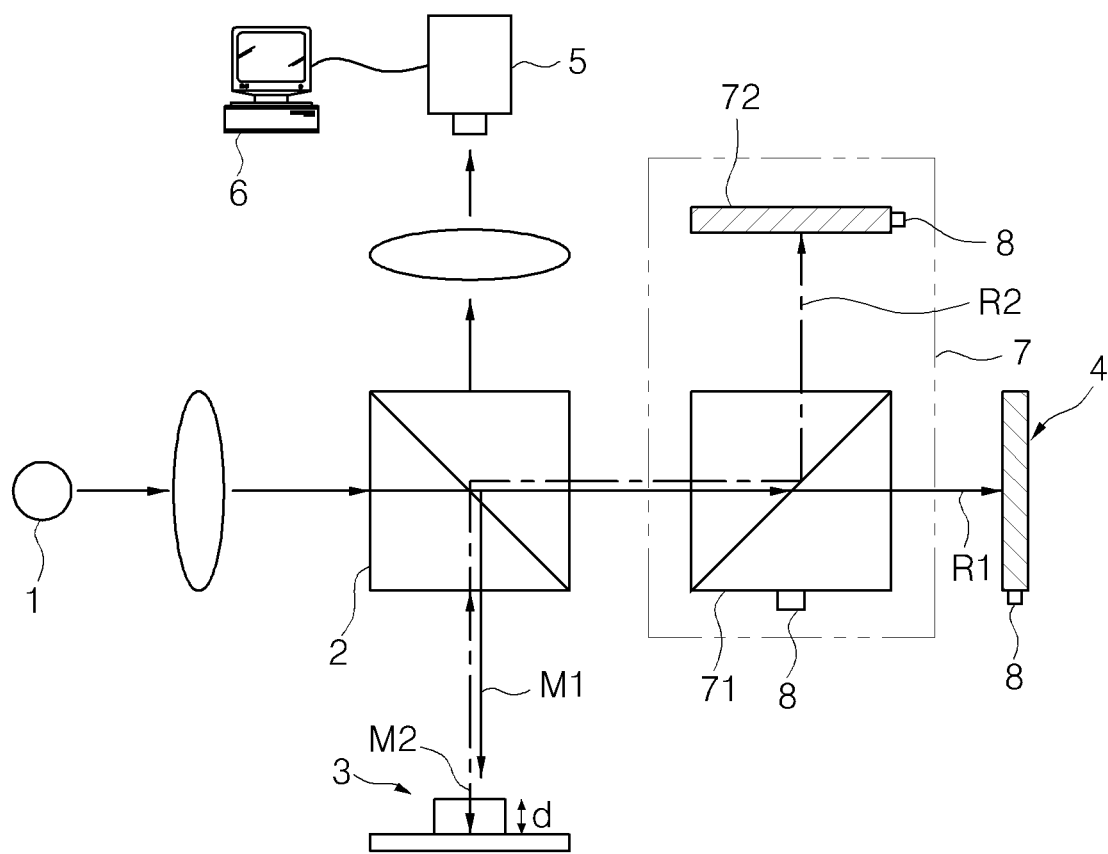
FIG. 1 is a schematic view of a three-dimensional shape measuring apparatus in accordance with the present invention

FIG. 1 is a schematic view of a three-dimensional shape measuring apparatus in accordance with the present invention. The three-dimensional measuring apparatus of the present invention includes a light source 1, a beam splitter 2, a target object 3 to be measured, a reference mirror 4, a light detecting element 5, a control computer 6, and a subsidiary reference beam generating unit 7.

Here, the beam splitter 2 splits illumination light emitted from the light source 1 into beams such that the beams are respectively irradiated onto the surface of the target object 3 and the reference mirror 4.

The target object 3 has a stepped structure with a height difference between the highest point and the lowest point, and reflects the illumination light from the beam splitter 2 to generate a highest object beam (M1) reflected by the highest point and a lowest object beam (M2) reflected by the lowest point.

The reference mirror 4 reflects the illumination beam from the beam splitter 2 to generate a reference beam, and the light detecting element 5 detects an interference pattern generated by the joining of an object beam and the reference beam and employs an image pickup element, such as a CCD camera.

The control computer 7 analyzes image data detected by the light detecting element 5, and thus determines whether or not the target object 3 is defective.

The subsidiary reference beam generating unit 7, which is an essential part of the present invention, is provided between the beam splitter 2 and the reference mirror 4, and changes the path of the beam from the beam splitter 2 to generate a subsidiary reference beam.

That is, since an interference pattern is generated when the interference beam and the object beam have the same focal distance and the same optical path, in order to simultaneously obtain an interference pattern for the highest point of the target object and an interference pattern for the lowest point of the target object, reference beams, which respectively have the same focal distances and the same optical paths as those of a highest object beam reflected by the highest point of the target object and a lowest object beam reflected by the lowest point of the target object, needs to be generated.

Therefore, the subsidiary reference beam generating unit 7 of the present invention generates a subsidiary reference beam R2, in addition to a reference beam R1 reflected by the reference mirror 4.

The subsidiary reference beam generating unit 7 includes a subsidiary beam splitter 71 and a subsidiary reference mirror 72.

The subsidiary beam splitter 71 is provided between the beam splitter 2 and the reference mirror 4, and the subsidiary reference mirror 72 is provided at one side of the subsidiary beam splitter 71 neighboring with the reference mirror 4.

Thereby, the illumination light split by the beam splitter 2 is split into two beams by the subsidiary beam splitter 71, and the two beams are irradiated respectively onto the reference mirror 4 and the subsidiary reference mirror 72.

At this time, the beam is irradiated directly onto the target object 3, but the beam to be irradiated onto the reference mirror 4 and the subsidiary reference mirror 72 passes through the subsidiary beam splitter 71 and thus has characteristics differing from the beam irradiated onto the target object 3.

Figure 2:
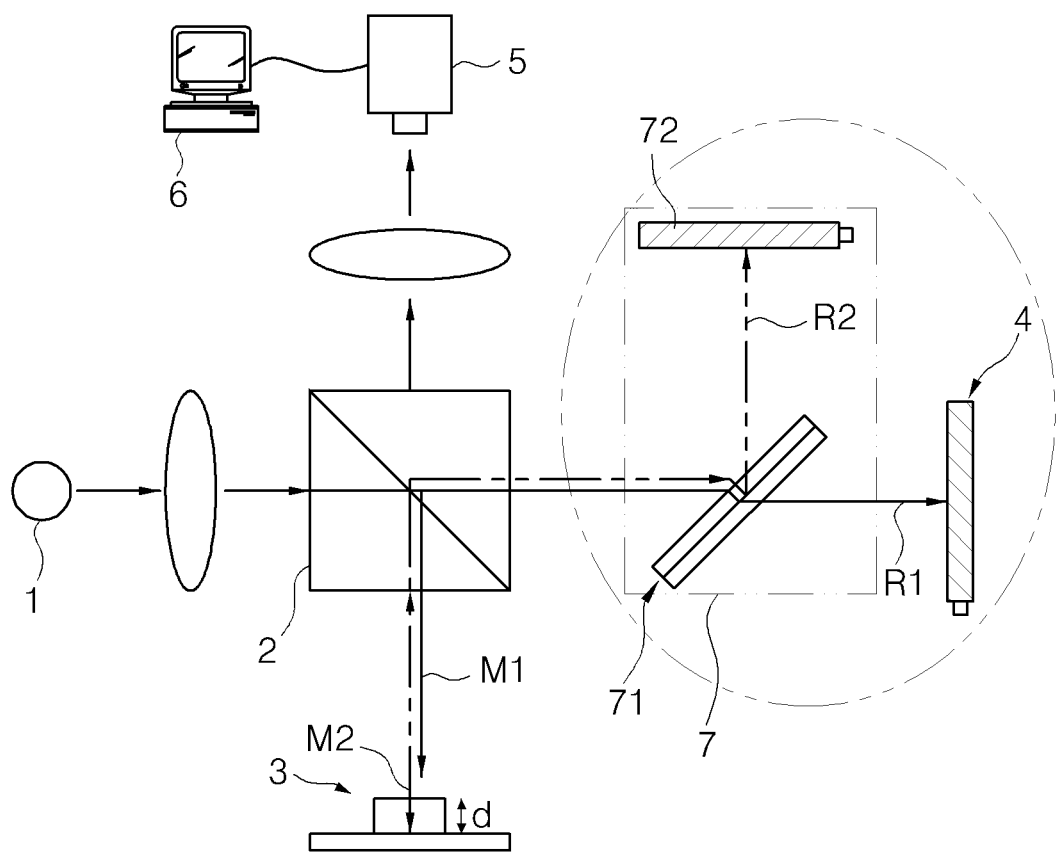
FIG. 2 is a schematic view illustrating a modified embodiment of the three-dimensional shape measuring apparatus of FIG. 1.
Figure 3:
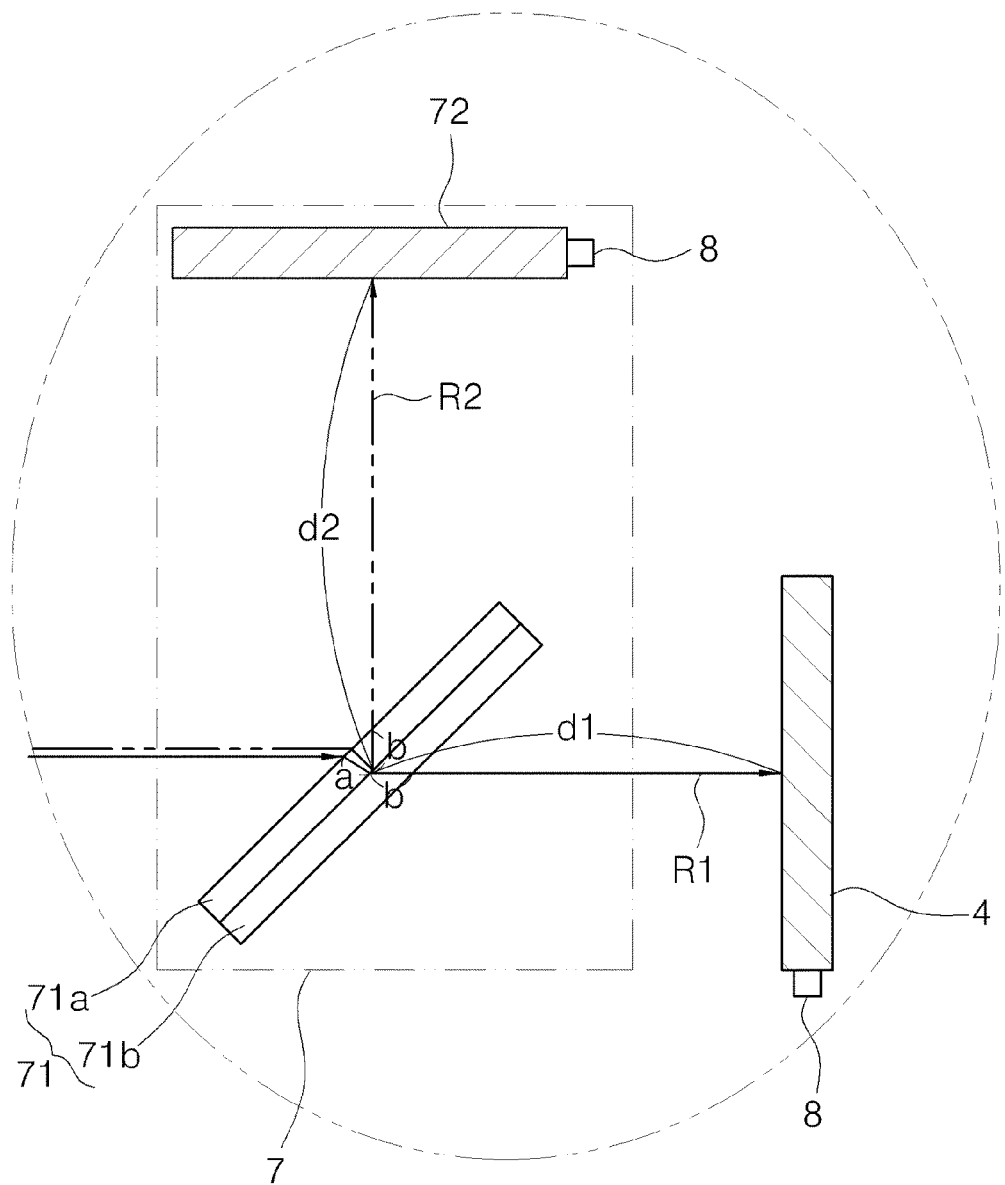
FIG. 3 is an enlarged view of a portion "A" of FIG. 2.

Thus, in order to maximally prevent the change in the characteristics of the beam, instead of a cubic beam splitter (CBS), a plate beam splitter 71a (referring to FIG. 3) provided with a flat front surface, onto which the beam emitted from the beam splitter 2 is irradiated, and a rear surface being parallel with the front surface, as shown in FIG. 2, is preferably used.

The front surface of the plate beam splitter 71a is coated with an anti-reflective material, and the rear surface of the plate beam splitter 71a is coated with a beam splitting material having a beam split ratio of 50%:50%.

Figure 4:
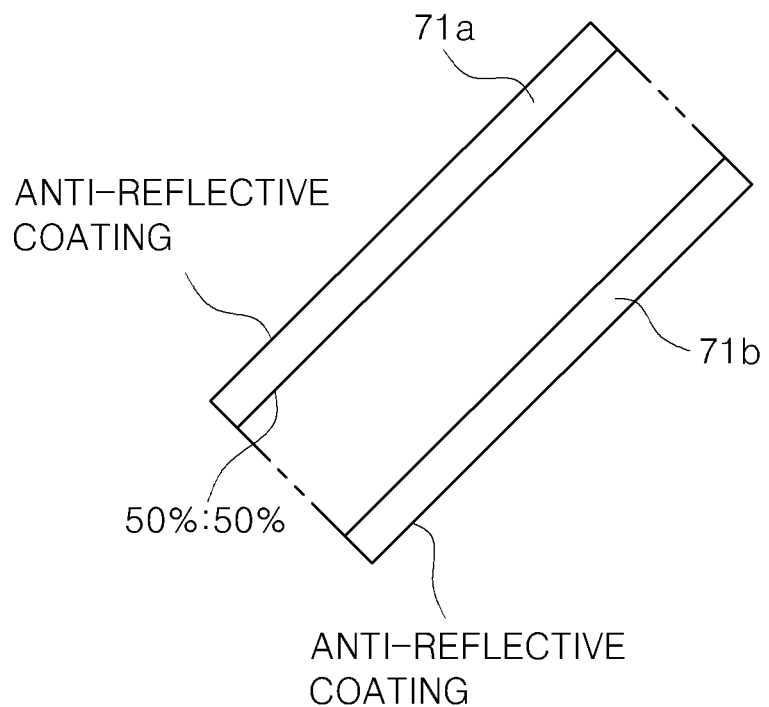
FIG. 4 is an exploded view of a subsidiary beam splitter of FIG. 3.
Figure 6:
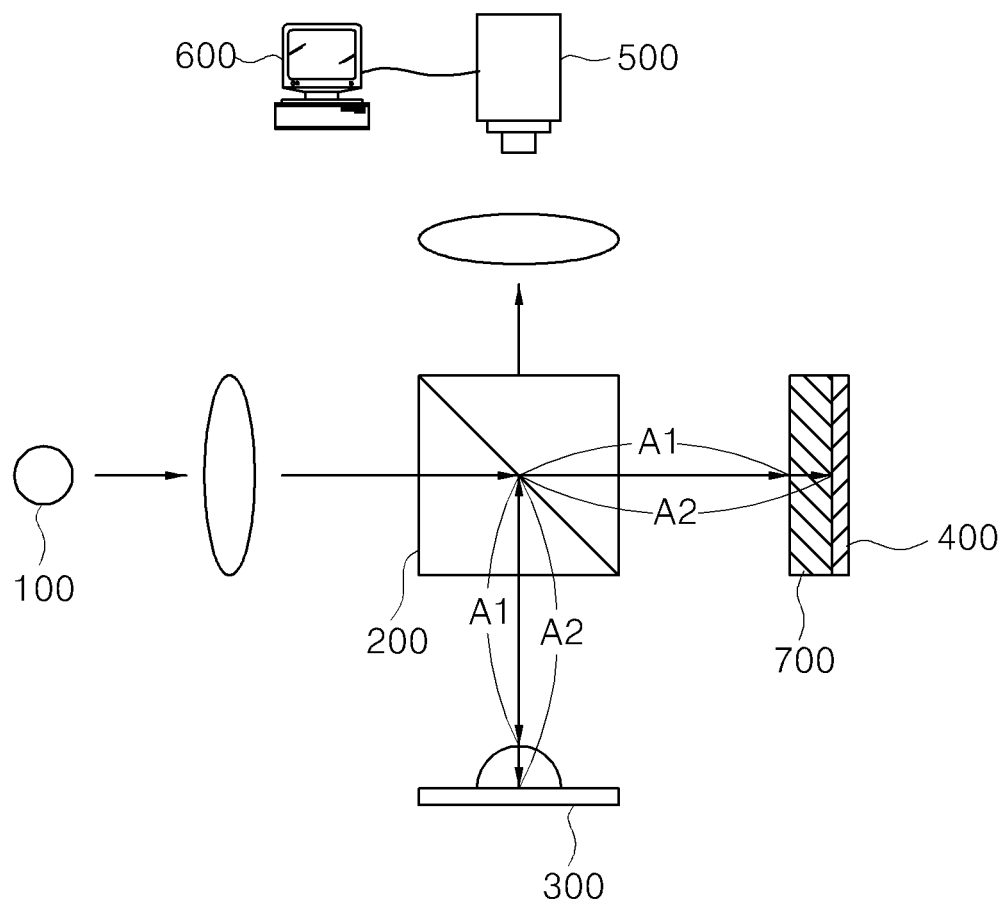

Preferably, a compensation plate 71 to adjust optical paths toward the reference mirror 4 and the subsidiary reference mirror 72 contacts the rear surface of the plate beam splitter 71a. The rear surface of the compensation plate 71b is coated with an anti-reflective material (referring to FIG. 4).

That is, the beam emitted from the beam splitter 2 is irradiated onto the front surface of the subsidiary beam splitter 71, and is split into two beams, which are respectively emitted in the directions of the reference mirror 4 and the subsidiary reference mirror 72, by the rear surface of the subsidiary beam splitter 71. Thus, there is a distance difference of "b" (referring to FIG. 3) between the optical paths within the subsidiary beam splitter 71.

That is, the beam irradiated onto the front surface of the subsidiary beam splitter 71 is divided into two beams, which are respectively emitted in the directions of the reference mirror 4 and the subsidiary reference mirror 72, by the rear surface of the subsidiary beam splitter 71 coated with a beam splitting material having a beam split ratio of 50%:50%. The beam in the direction of the reference mirror 4 is exposed in the air, as it is, and advances toward the reference mirror 4.

On the other hand, the beam in the direction of the subsidiary reference mirror 72 is reflected by the rear surface of the plate beam splitter 71, passes through the plate beam splitter 71a again, and is emitted through the front surface of the plate beam splitter 71a. Thus, there is a distance difference, corresponding to a distance within the subsidiary beam splitter 71, between the optical paths of the beams in the direction of the reference mirror 4 and the subsidiary reference mirror 72.

In order to compensate for the distance difference within the subsidiary beam splitter 71, the compensation plate 71b, the rear surface of which is coated with the anti-reflective material, is further provided in the direction of the reference mirror 4, i.e., on the rear surface of the subsidiary beam splitter 71.

Each of the subsidiary beam splitter 71, the reference mirror 4, and the subsidiary reference mirror 72 may be provided with a fine driving unit 8, which finely drive the corresponding one of the subsidiary beam splitter 71, the reference mirror 4, and the subsidiary reference mirror 72 in the corresponding direction of directions of X, Y, and Z axes to adjust focal distances and optical paths of the reference beam R1 and the subsidiary reference beam R2.

Hereinafter, the operation of the three-dimensional shape measuring apparatus of the present invention will be described.

First, light supplied from the light source 1 is divided into two beams by the beam splitter 2, and the two beams are respectively emitted from the beam splitter 2 in the direction of the target object 3 and the direction of the reference mirror 4 and are respectively reflected by the surface of the target object 3 and the surface of the reference mirror 4, thus producing object beams and reference beams.

The target object 3 having a stepped structure with a designated height difference generates a highest object beam M1 reflected by the highest point of the target object 3 and a lowest object beam M2 reflected by the lowest point of the target object 3. Therefore, in order to generate reference beams R1 and R2 having the same focal distances and optical paths as those of the respective object beams M1 and M2 of the target object 3, the respective fine driving units 8 are driven to adjust the positions of the reference mirror 4, the subsidiary beam splitter 71, and the subsidiary reference mirror 72.

At this time, in case that any one beam of the reference beam R1 generated by the reference mirror 4 and the subsidiary reference beam R2 generated by the subsidiary reference mirror 72 has the same optical path as that of the highest object beam M1, the other one beam of the reference beam R1 and the subsidiary reference beam R2 needs to have the same optical path as that of the lowest object beam M2.

Industrial Applicability

As apparent from the above description, the three-dimensional shape measuring apparatus of the present invention includes the subsidiary reference beam generating unit at one side of the reference mirror, and generates a reference beam and a subsidiary reference beam, which respectively have the same optical paths as those of a highest object beam and a lowest object beam respectively reflected by the highest point and the lowest point of a target object having a stepped structure with a height difference, thereby simultaneously obtaining an interference pattern for the highest point of the target object and an interference pattern for the lowest point of the target object, and thus improving inspection speed and efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A three-dimensional shape measuring apparatus, comprising:
   a light source;
   a beam splitter to split illumination light from the light source into beams;
   a target object to be measured, on which one beam emitted from the beam splitter is irradiated, having a height difference between the highest point and the lowest point;
   a reference mirror, on which another beam emitted from the beam splitter is irradiated;
   a light detecting element to detect an interference pattern generated by the interference of an object beam reflected by the surface of the target object and a reference beam reflected by the surface of the reference mirror; and
   a control computer to process an image detected by the light detecting element, wherein a subsidiary reference beam generating unit to change the optical path of the beam from the beam splitter to generate a subsidiary reference beam is provided between the beam splitter and the reference mirror, wherein the subsidiary reference beam generating unit includes:

a subsidiary beam splitter provided between the beam splitter and the reference mirror; and a subsidiary reference mirror provided at one side of the subsidiary beam splitter neighboring with the reference mirror, wherein the subsidiary beam splitter includes a plate beam splitter provided with a fiat front surface, onto which the beam from the beam splitter is irradiated, and a rear surface being parallel with the front surface, wherein the subsidiary beam splitter further includes a compensation plate contacting the rear surface of the plate beam splitter to adjust optical paths toward the reference mirror and the subsidiary reference mirror.

2. The three-dimensional shape measuring apparatus according to claim 1, wherein the front surface of the plate beam splitter is coated with an anti-reflective material, and the rear surface of the plate beam splitter is coated with a beam splitting material.

3. The three-dimensional shape measuring apparatus according to claim 2, wherein the rear surface of the compensation plate is coated with an anti-reflective material.

4. The three-dimensional shape measuring apparatus according to claim 3, wherein the subsidiary reference beam generating unit further includes a fine driving unit to finely drive at least one of the subsidiary beam splitter, the reference minor, and the subsidiary reference mirror in the direction of an X, Y, or Z axis.

5. The three-dimensional shape measuring apparatus according to claim 2, wherein the beam split ratio of the rear surface of the plate beam splitter is set to 50%:50%.

6. The three-dimensional shape measuring apparatus according to claim 5, wherein the rear surface of the compensation plate is coated with an anti-reflective material.

7. The three-dimensional shape measuring apparatus according to claim 6, wherein the subsidiary reference beam generating unit further includes a fine driving unit to finely drive at least one of the subsidiary beam splitter, the reference minor, and the subsidiary reference mirror in the direction of an X, Y, or Z axis.

8. The three-dimensional shape measuring apparatus according to claim 1, wherein the rear surface of the compensation plate is coated with an anti-reflective material.

9. The three-dimensional shape measuring apparatus according to claim 8, wherein the subsidiary reference beam generating unit further includes a fine driving unit to finely drive at least one of the subsidiary beam splitter, the reference minor, and the subsidiary reference mirror in the direction of an X, Y, or Z axis.

* * * * *